United States Patent [19]

Hasegawa

[11] Patent Number: 5,534,974
[45] Date of Patent: Jul. 9, 1996

[54] PRINTING APPARATUS PERFORMING BIDIRECTIONAL COMMUNICATION WITH A PLURALITY OF USER TERMINALS

[75] Inventor: Hironobu Hasegawa, Yokohama, Japan

[73] Assignee: Ricoh Company, Ltd., Tokyo, Japan

[21] Appl. No.: 324,686

[22] Filed: Oct. 18, 1994

[30] Foreign Application Priority Data

Oct. 20, 1993 [JP] Japan .................................. 5-285718

[51] Int. Cl.$^6$ ..................................................... G03G 21/00
[52] U.S. Cl. .......................... 355/202; 355/208; 355/209; 355/309
[58] Field of Search ..................................... 355/200, 202, 355/204, 206, 208, 209, 308, 309, 311; 271/9.1

[56] References Cited

U.S. PATENT DOCUMENTS

| | | | |
|---|---|---|---|
| 5,141,222 | 8/1992 | Sawada et al. | 271/292 |
| 5,168,316 | 12/1992 | Hino et al. | 355/309 |
| 5,172,178 | 12/1992 | Oushiden et al. | 355/311 |
| 5,308,058 | 5/1994 | Mandel et al. | 271/297 |
| 5,311,270 | 5/1994 | Urakawa et al. | 355/308 |
| 5,374,045 | 12/1994 | Mililo | 271/9 |

FOREIGN PATENT DOCUMENTS

| | | |
|---|---|---|
| 242146 | 12/1985 | Japan . |
| 182636 | 7/1990 | Japan . |
| 12014 | 2/1991 | Japan . |

OTHER PUBLICATIONS

English abstract of Japanese Laid–Open Patent Application No. 58–31834 (published as Japanese Patent Publication No. 3–12014 on Feb. 19, 1991).

*Primary Examiner*—Sandra L. Brase
*Attorney, Agent, or Firm*—Cooper & Dunham

[57] ABSTRACT

There is provided a printing apparatus in which a paper-supplying tray being used by one user is not allowed to be used by the other users. The printing apparatus is used by a plurality of users by means of bidirectional communication. One or more paper-supplying trays are provided in the printer. One of the paper-supplying trays is designated by one of the users so that the one of the paper-supplying trays is exclusively used by the one of the users. When the one of the paper-supplying trays currently being exclusively used is designated by another user, the fact that the designated one of the paper-supplying trays is occupied is notified to the another user.

11 Claims, 7 Drawing Sheets

FIG.2

| PAPER-SUPPLYING TRAY | TRAY-SELECTING ID |
|---|---|
| NON-FIXED | 0 |
| #1 | 1 |
| #2 | 2 |
| #3 | 3 |
| . | . |
| . | . |
| . | . |

FIG.3

| PAPER-SUPPLYING-TRAY ID | STATUS | PAPER SIZE | OCCUPYING USER ID |
|---|---|---|---|
| 1 | PAPER AVAILABLE | A4 | −1 |
| 2 | PAPER AVAILABLE | LT | 5 |
| 3 | PAPER OUT | LT | −1 |
| 4 | PAPER AVAILABLE | LT | −1 |
| 5 | PAPER AVAILABLE | LT | −1 |
| . | . | . | . |
| . | . | . | . |
| . | . | . | . |

PRINTING APPARATUS PERFORMING BIDIRECTIONAL COMMUNICATION WITH A PLURALITY OF USER TERMINALS

BACKGROUND OF THE INVENTION

The present invention generally relates to a printing apparatus, and more particularly to a printing apparatus having one or more paper supply trays, which printing apparatus can perform bidirectional communication with a plurality of user terminals.

A printing apparatus, for example, disclosed in Japanese Patent Publication No. 3-12014 has a plurality of paper-supplying means so that one paper-supplying tray being used can be automatically changed to another paper-supplying tray when recording papers are out. That is, in this apparatus, when recording papers stored in one of paper-supplying trays are out, another tray is selected to continue a paper-supplying operation. The tray is selected from among paper-supplying trays which were previously assigned.

A recording apparatus disclosed in Japanese Laid-Open Patent Application No. 60-242146 has a plurality of paper cassettes, each storing different sizes of recording papers. In this recording apparatus, when a user selects a size of recording paper to be used, the paper cassette in which the recording paper is of the selected size is automatically used.

Additionally, Japanese Laid-Open Patent Application No. 2-182636 discloses an image-forming apparatus which automatically changes a paper-supplying tray when the recording papers in one paper-supplying tray being used are out. The selection of the paper-supplying tray is performed on the basis of a priority order given to each paper-supplying tray.

In a conventional printing apparatus including the above-mentioned printing apparatuses, use of a plurality of users is not considered as to a control of paper-supplying trays. Accordingly, even if one user is printing by using a particular paper-supplying tray at a fixed mode, the particular paper-supplying tray can be used by other users when they assign a link-tray mode. As a result, if the one user puts special recording papers in the paper-supplying tray, a printing operation of the other users may be performed with the special recording papers which the other users do not expect. Additionally, if the one user has put a predetermined number of recording papers in the particular paper-supplying tray, the recording papers may be used by the other users, and thus the one user cannot control the number of recording papers left in the particular paper-supplying tray which the one user is using.

SUMMARY OF THE INVENTION

It is a general object of the present invention to provide a printing apparatus in which the above-mentioned disadvantages are eliminated.

A more specific object of the present invention is to provide a printing apparatus in which a paper-supplying tray being used by one user is not allowed to be used by the other users.

Another object of the present invention is to provide a printing apparatus in which a paper-supplying tray being used by one user is allowed to be used by the other users only when the one user permits a usage of the paper-supplying tray.

Another object of the present invention is to provide a printing apparatus in which a user can designate an arbitrary paper-supplying tray among a plurality of paper-supplying trays storing recording papers having the same paper size.

In order to achieve the above-mentioned objects, there is provided according to one aspect of the present invention a printing apparatus used by a plurality of users by means of bidirectional communication, the printing apparatus comprising;

one or more paper-supplying trays for supplying recording papers to be printed;

tray-designating means for designating one of the paper-supplying trays, the one of the paper-supplying trays being designated by one of the users, the one of the paper-supplying trays designated by the tray-designating means being exclusively used by the one of the users; and notifying means for notifying another of the users, when one of the paper-supplying trays currently being exclusively used is designated by the another of the users, the fact that the designated one of the paper-supplying trays is occupied.

There is provided according to another aspect of the present invention a printing apparatus used by a plurality of users by means of bidirectional communication, the printing apparatus comprising;

one or more paper-supplying trays for supplying recording papers to be printed;

tray-designating means for designating one of the paper-supplying trays, the one of the paper-supplying trays being designated by one of the users, the one of the paper-supplying trays designated by the tray-designating means being exclusively used by the one of the users; and notifying means for notifying the one of the users, when the one of the paper-supplying trays currently being exclusively used is designated by another of the users, the fact that the one of the paper-supplying trays exclusively used is designated by the another of the users.

There is provided according to another aspect of the present invention, a printing apparatus used by a plurality of users by means of bidirectional communication, the printing apparatus comprising;

one or more paper-supplying trays for supplying recording papers to be printed;

tray-designating means for designating one of the paper-supplying trays, the one of the paper-supplying trays being designated by one of the users, the one of the paper-supplying trays designated by the tray-designating means being exclusively used by the one of the users, the designation of the one of the paper-supplying trays being made by either one of a fixed mode or a non-fixed mode, a single paper-supplying tray being designated by the fixed mode, any one of the paper-supplying trays storing the recording papers having the same size being designated by the non-fixed mode; and means for selecting one of the paper-supplying trays which is not designated by the fixed mode when a designation of the paper-supplying trays is made by the non-fixed mode.

Other objects, features, and advantages of the present invention will become more apparent from the following detailed description when read in conjunction with the accompanying drawings.

BRIEF DESCRIPTION OF THE DRAWINGS

FIG. 2 is an illustration showing an example of correspondence between numbers of paper-supplying trays and tray-selecting IDs;

FIG. 3 is an illustration showing an example of contents of an information table;

DETAILED DESCRIPTION OF THE PREFERRED EMBODIMENTS

Figure 1:
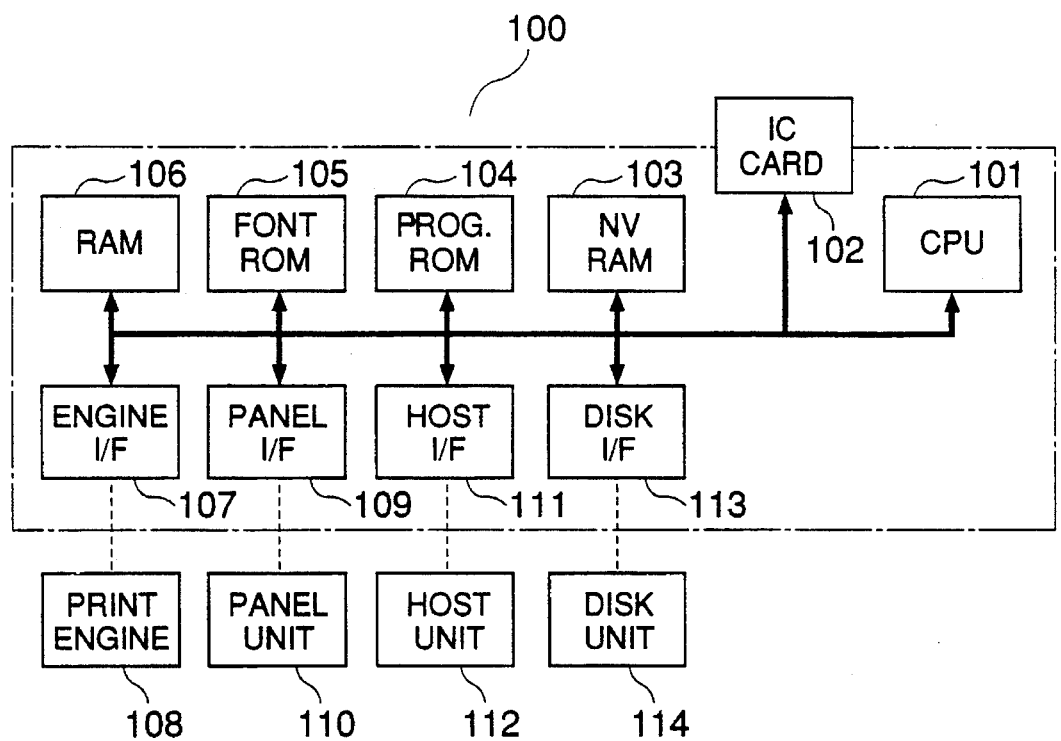
FIG. 1 is a block diagram of a controller used in a printing apparatus of a first embodiment according to the present invention.

A description will now be given, with reference to FIG. 1, of a first embodiment according to the present invention. FIG. 1 is a block diagram of a controller 100 which is an essential part of the first embodiment according to the present invention.

The controller 100 comprises a central processing unit (CPU) 101, an NVRAM 103, a programmable ROM 104, a font ROM 105 and a RAM 106. The CPU 101 controls an entire operation of the controller 100 in accordance with a program stored in the programmable ROM 104, a mode instruction supplied by a panel unit 110 and commands supplied by a host unit 112. An IC card 102 supplies font data and program data to the controller 100.

The NVRAM 103 is a non-volatile memory which stores mode instruction information supplied by the panel unit 110. The mode instruction information is supplied from the panel unit 110 to the controller 100 via a panel interface (I/F) 109. The programmable ROM 104 stores programs for controlling the controller 100.

The font ROM 105 stores pattern data of font. The RAM 106 comprises a work memory for the CPU 101, an input buffer for input data, a page buffer for print data and a memory for down-load font.

Communication for commands, status information and print data is performed between the controller 100 and a print engine 108 via an engine interface (I/F) 107.

The panel unit 110 notifies a user of a current status of the printer, and serves as an input terminal from which mode command is input. The host unit communicates with the controller 100 via a host interface (I/F) 111 which may be a Centronics interface or an RS232C interface.

The controller 100 also communicates with a disk unit 114 via a disk interface (I/F) 113. The disk unit 114 may be a floppy disk drive or a hard disk drive which can store various data such as font data, program data and print data.

The controller 100 receives data including a character code, a control code and a control command from the host unit 112 via the host I/F 111, and the data is temporarily stored in the input buffer of the RAM 106.

The data stored in the input buffer is then read out, and attribute data for each datum read out from the input buffer is stored in the page buffer. The attribute data includes head address of the font pattern, width of the font pattern, height of the font pattern, page layout information such as printing position. When data corresponding to one page has been stored in the page buffer, the data in the page buffer is transferred to the frame buffer. The data is stored in the frame buffer by means of bit mapping. When the bit mapping is completed, various commands are sent to the print engine 108 via the engine I/F 107. The commands include a paper-supplying-tray selecting command, an eject-tray selecting command and a print command. The bit mapped data in the frame buffer is then output to the print engine 108 as video data.

The print engine 108, having a plurality of paper-supplying trays, performs a printing operation in accordance with the above-mentioned commands and video data supplied by the controller 100. That is, a recording paper is fed from a selected paper-supplying tray; a printing operation is performed on the recording paper; and the recorded paper is ejected to a selected eject tray.

The controller 100 assigns an identification (ID) to each user so as to discriminate between a plurality of users. The plurality of users can be connected to the controller 100 by having a plurality of host interfaces 111, and an ID is assigned to each of the host interfaces 111. The controller 100 may instead be connected to a network system having a server which assigns an ID to each of the users connected to the network system. The server adds the respective ID to job data for each user.

The selection of the paper-supplying tray can be made by adding a tray-selecting ID to a head of one job data. The tray-selecting ID may be a fixed-tray selecting ID by which only one tray is assigned or a non-fixed-tray selecting ID by which any tray can be selected as long as a paper size is met. FIG. 2 shows an example of selecting method of the paper-supplying tray in accordance with the tray-selecting ID.

In the controller 100, an information table for the paper-supplying trays is provided, as shown in FIG. 3, so as to manage a plurality of paper-supplying trays. In this information table, information including a status of each tray, a paper size and an occupying user ID for each tray is registered. When the information table is initialized, each item of the occupying user ID in the information table is set to −1.

Thereafter, the information for the status of each paper-supplying tray and the paper size stored in the respective tray is obtained by communicating with the print engine 108 via the engine I/F 107. Each item in the information table is then set in accordance with the information obtained from the print engine 108. The information from the print engine 108 may be obtained periodically or at each event in which a status of the paper-supplying trays is changed.

When the tray-selecting ID is received, a user ID corresponding to the received tray-selecting ID is registered to the item for the occupying user ID in the information table. If the tray-selecting ID indicates 0, the user ID is not registered to the information table.

Figure 4:
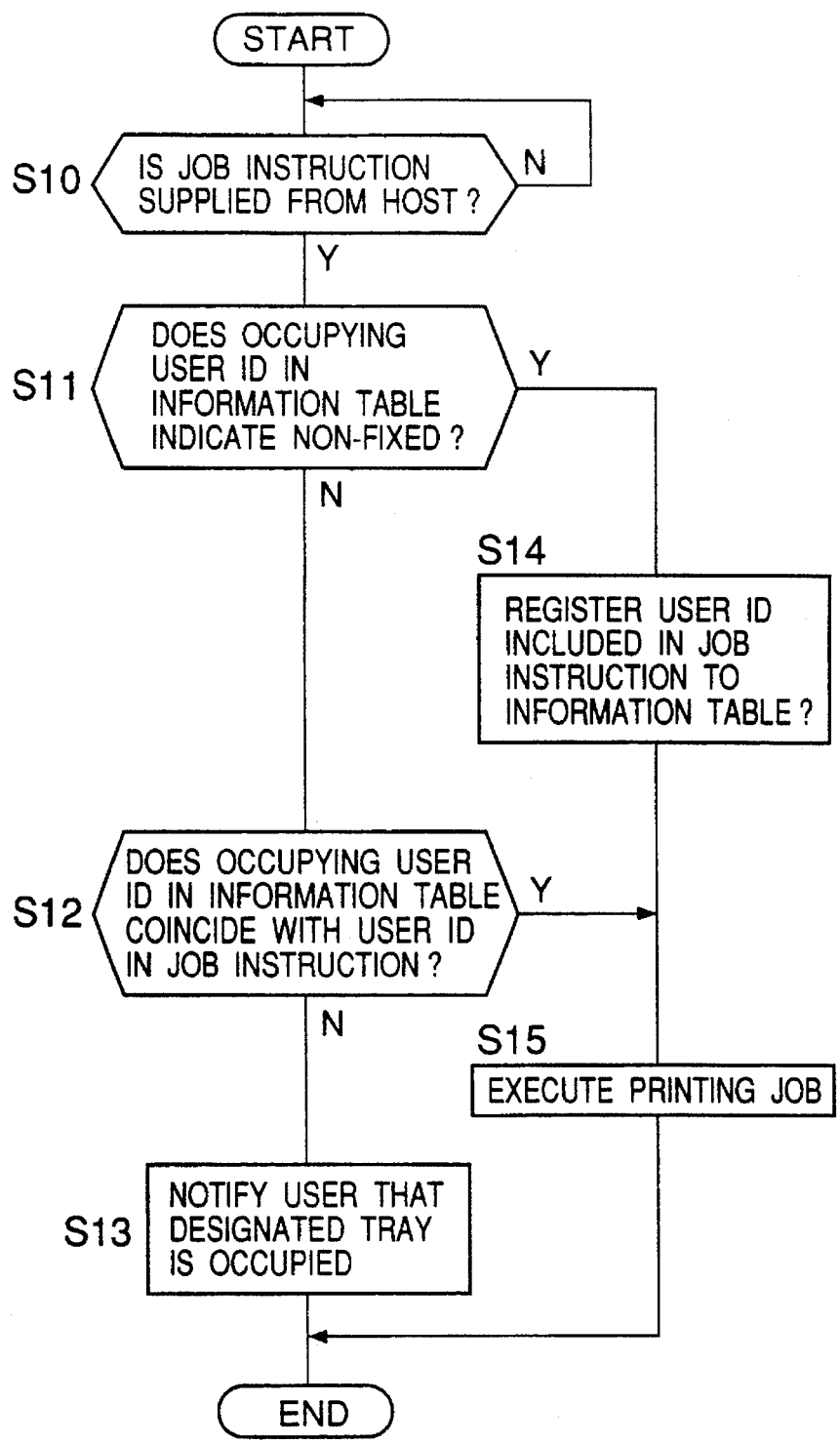
FIG. 4 is a flow chart of an operation of the first embodiment according to the present invention.

A description will now be given, with reference to FIG.4, of an operation of the first embodiment according to the present invention.

First, in step 10 (hereinafter step is abbreviated as S), it is determined whether a job instruction is being sent from the host unit. If there is a job instruction, it is determined, in S11, whether or not the paper-supplying tray being selected according to the tray-selecting ID included in the job instruction has already been assigned to other users by referring to the occupying user ID corresponding to the paper-supplying-tray ID in the information table.

If it is determined that no occupying user ID has been registered, the routine proceeds to S14 where the user ID included in the job instruction is registered to the corresponding item in the information table. After that, a printing job is executed, in S15, in accordance with the job instruction, and the routine ends.

On the other hand, if it is determined, in S11, that a user ID of other users has already been registered as a occupying user ID, the routine proceeds to S12 where it is determined whether or not the registered occupying user ID coincides with the tray selection ID included in the job instruction. If it is determined that the registered occupying user ID coincides with the tray-selecting ID, the routine proceeds to S15 to execute the printing job, and then the routine ends.

If it is determined, in S12, that the registered occupying user ID does not coincide with the tray-selecting ID, notification is made, in S13, to the user who has sent the job instruction that the designated paper-supplying tray has already been assigned to other users. This notification is made by means of a predetermined command to be sent to the host unit from which the job instruction has been supplied.

After that, a new tray-selecting ID may be requested to the user, or other jobs may be executed first.

Figure 5:
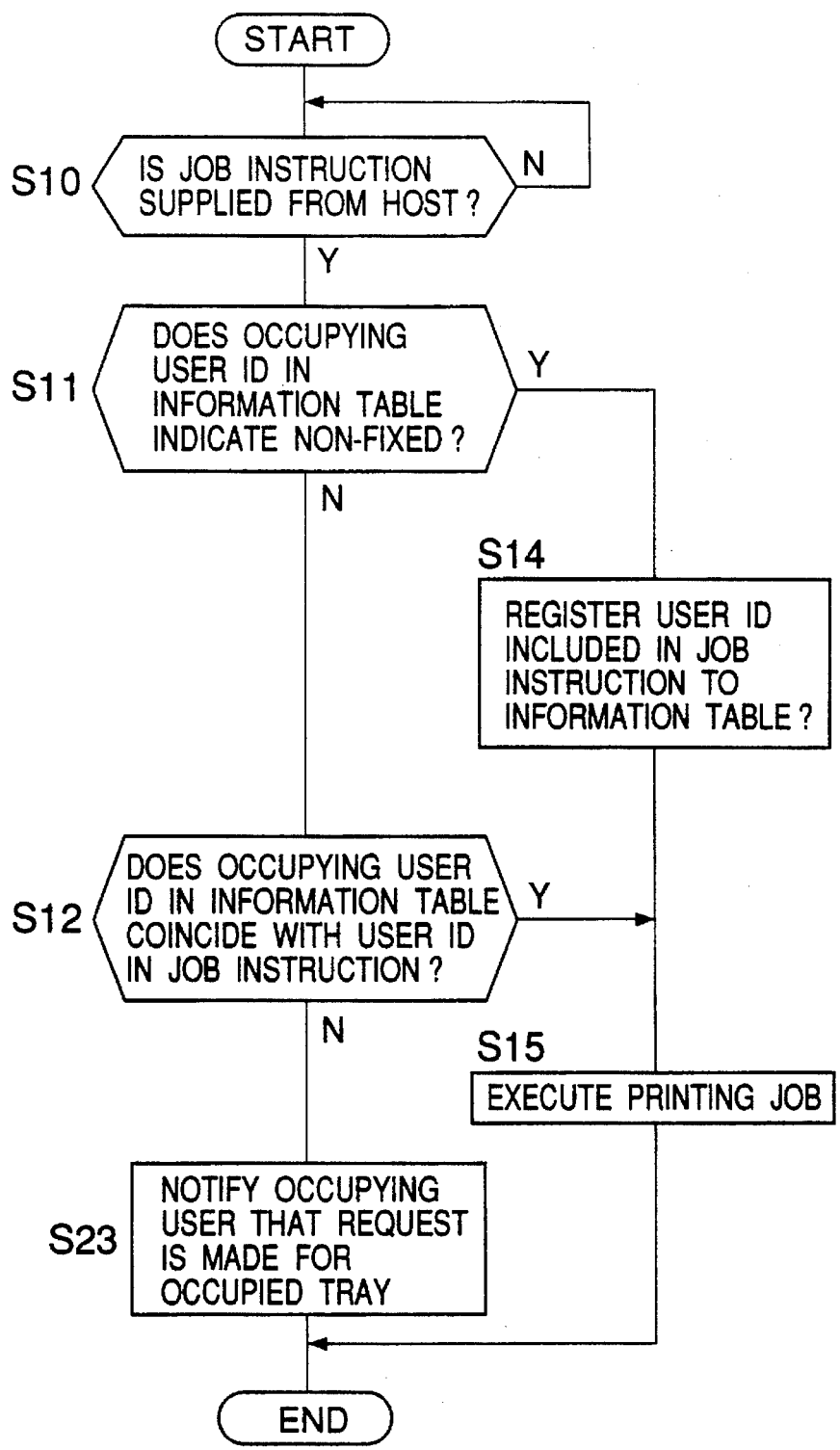
FIG. 5 is a flow chart of an operation of a second embodiment according to the present invention.

A description will now be given, with reference to FIG. 5, of an operation of a second embodiment according to the present invention. It should be noted that a structure of the second embodiment according to the present invention is the same as that of the first embodiment described above.

The operation of the second embodiment is the same as that of the first embodiment except for a process performed in S23, and thus steps that are the same as the steps of the first embodiment are given the same step numbers, and descriptions thereof will be omitted.

In the second embodiment, if it is determined, in S12, that the registered occupying user ID does not coincide with the tray-selecting ID, notification is made, in S23, to the occupying user who corresponds to the registered occupying user ID in the information table that a request for using the occupied paper-supplying tray has been made by another user, instead of notifying the user who has sent the job instruction that the designated paper-supplying tray has already been assigned to other users. This notification to the occupying user is made by means of a predetermined command to be sent to the host unit.

The job may be executed after the occupied paper-supplying tray is allowed for use by other users, or other jobs may be executed first.

Figure 6:
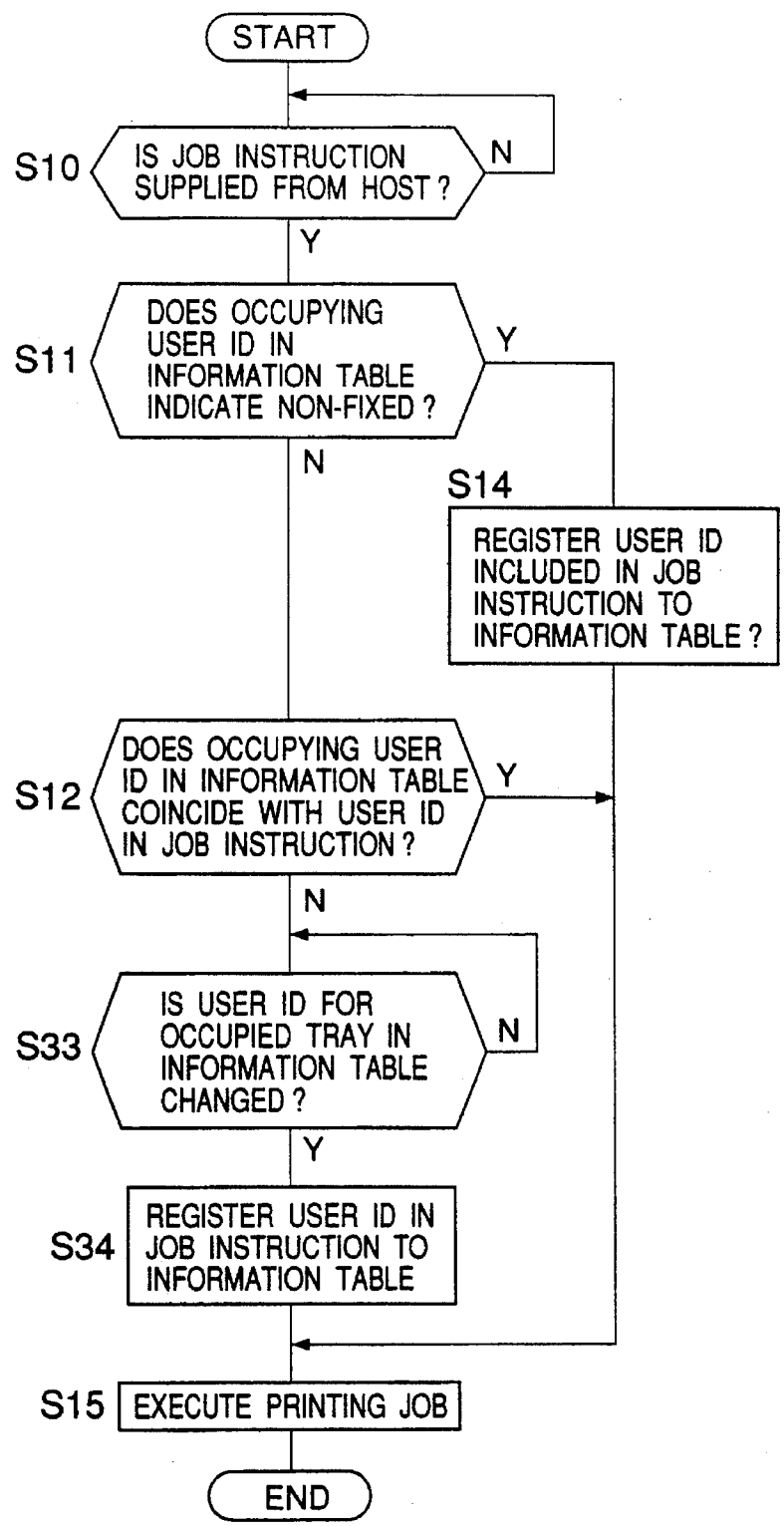
FIG. 6 is a flow chart of an operation of a third embodiment according to the present invention.

A description will now be given, with reference to FIG. 6, of an operation of a third embodiment according to the present invention. It should be noted that a structure of the third embodiment according to the present invention is the same as that of the first embodiment described above.

The operation of the third embodiment is the same as that of the first embodiment except for processes performed in S33 and S34, and thus steps that are the same as the steps of the first embodiment are given the same step numbers, and descriptions thereof will be omitted.

In the third embodiment, if it is determined, in S12, that the registered occupied user ID does not coincide with the tray-selecting ID, notification is made to the user who has sent the job instruction that the designated paper-supplying tray has already been assigned to other users, and then the routine proceeds to S33.

In S33, it is determined whether or not the registered occupying user ID is canceled by monitoring the contents of the information table. If it is determined that the registered occupying user ID is canceled, the user ID included in the job instruction is automatically registered, in S34, instead of the canceled occupying user ID, and the routine proceeds to S15 where the printing job is executed.

Figure 7:
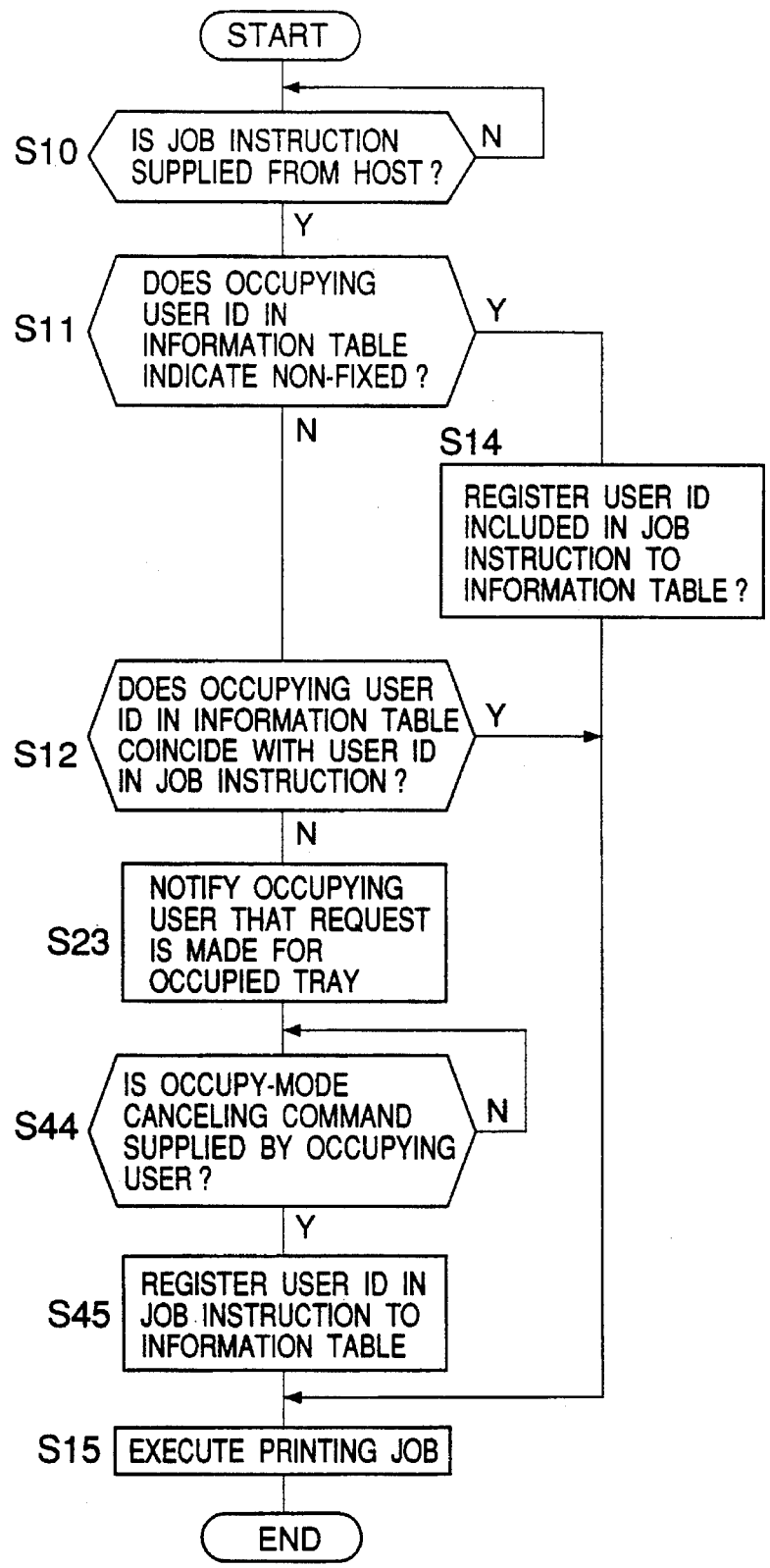
FIG. 7 is a flow chart of an operation of a fourth embodiment according to the present invention.

A description will now be given, with reference to FIG. 7, of an operation of a fourth embodiment according to the present invention. It should be noted that a structure of the fourth embodiment according to the present invention is the same as that of the first embodiment described above.

The operation of the fourth embodiment is the same as that of the second embodiment except for processes performed in S44 and S45, and thus steps that are the same as the steps of the second embodiment are given the same step numbers, and descriptions thereof will be omitted.

In the fourth embodiment, if it is determined, in S12, that the registered occupying user ID does not coincide with the tray-selecting ID, notification is made, in S23, to the user who has sent the job instruction that the designated paper-supplying tray has already been assigned to other users, and then the routine proceeds to S44.

In S44, it is determined whether or not an occupy-mode canceling command is supplied from the user who is occupying the designated paper-supplying tray. If it is determined that the occupy-mode canceling command is supplied, the routine proceeds to S45 where the user ID included in the job instruction is registered instead of the registered occupying user ID. The routine then proceeds to S15 where the printing job is executed.

A description will now be given of an operation of a fifth embodiment according to the present invention. It should be noted that a structure of a printing apparatus of the fifth embodiment according to the present invention is the same as that of the first embodiment described above.

The fifth embodiment is directed to a case in which the non-fixed-tray selecting ID is included in the job instruction. If the user designates the non-fixed-tray selecting ID, all of user IDs, paper sizes and statuses in the information table are checked in that order.

Figure 8:
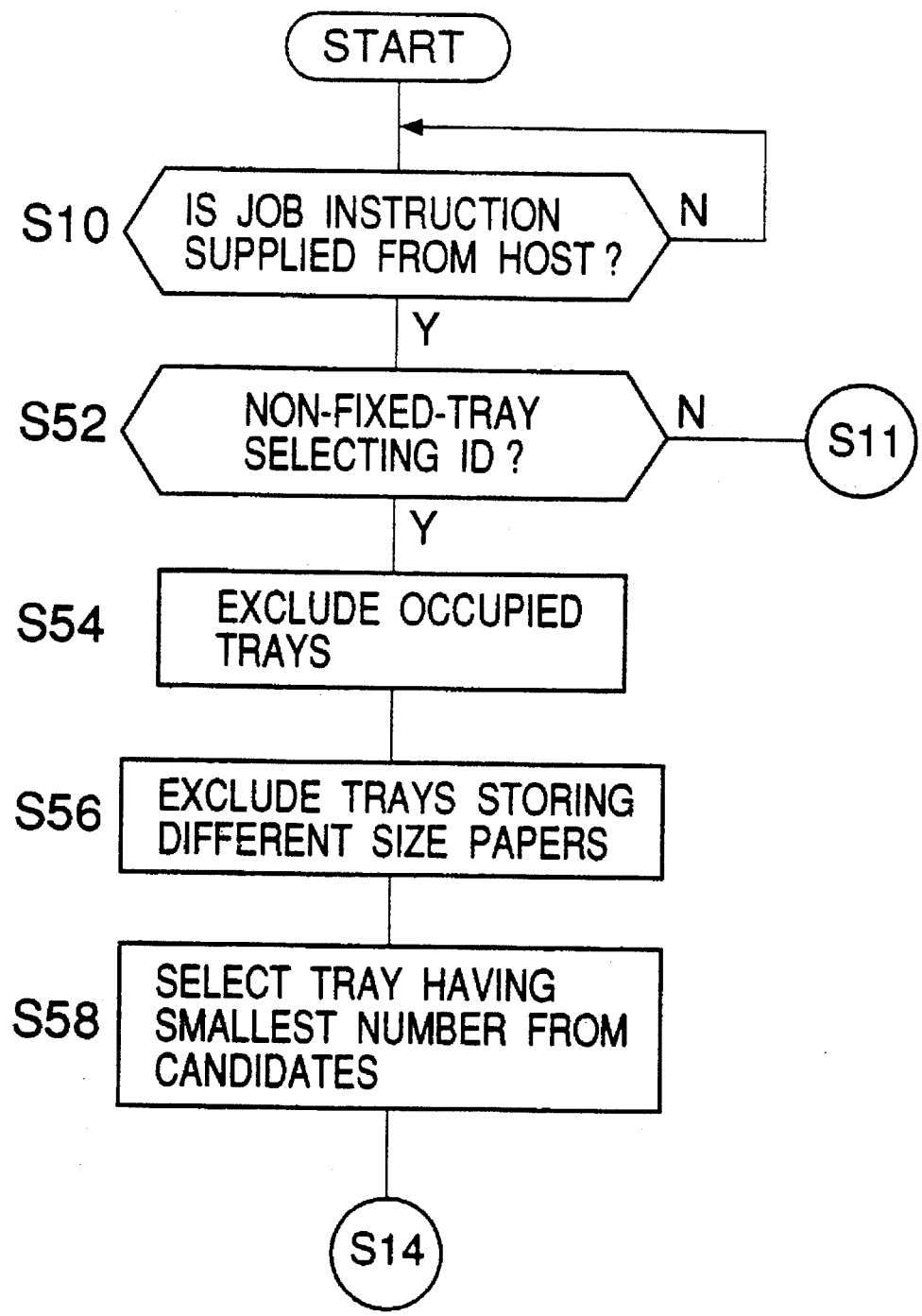
FIG. 8 is a flow chart of a part of an operation of a fifth embodiment according to the present invention.

FIG. 8 is a flow chart of a part of an operation of the fifth embodiment. The operation of the fifth embodiment is basically the same as those of the first to fourth embodiments described above except for processes in a case where the non-fixed-tray selecting ID is included in the job instruction.

If it is determined, in S10, that a job instruction is supplied from the host unit, the routine proceeds to S52 where it is determined whether or not the tray-selecting ID included in the job instruction is the non-fixed-tray selecting ID. If the tray-selecting ID is not the non-fixed-tray selection ID, the routine proceeds to S11 to executes steps similar to one of the operations of the above-mentioned first to fourth embodiments.

On the other hand, if it is determined, in S52, that the tray-selecting ID included in the job instruction is the non-fixed-tray selecting ID, the routine proceeds to S54 where all of the paper-supplying trays occupied by users other than the user corresponding to the user ID included in the job instruction are excluded from candidates of the paper-supplying tray to be used. Additionally, in S56, the paper-supplying trays which do not meet the paper size included in the job instruction are excluded from the remaining candidates of the paper-supplying trays. Further, in S58, a paper-supplying tray having the smallest number is selected from among the remaining candidates, and then the routine proceeds to S14 where to execute the printing job similarly to one of the manners described in the first to fourth embodiments. In the case of the fifth embodiment, the user ID included in the job instruction is not registered to the information table.

Specifically, in a case in which the information table is set as shown in FIG. 3, when the user #2 sets the tray-selecting ID to 0 and intends to use a paper size of LT (letter size), the tray #3 is excluded by the first checking procedure, the tray #1 is excluded by the second checking procedure, and then the tray #3 is excluded in the last checking procedure. Eventually, the tray #4 is selected.

If the paper-supplying tray is selected in accordance with non-fixed-tray selecting ID as described above, and thereafter if that paper-supplying tray is designated by another user (later user), the occupying user ID registered in the information table is changed to the user ID corresponding to the later user. The paper-supplying tray for the current user is selected again in the same manner as described above, and the printing job is executed with a reselected paper-supplying tray.

For example, if the user #3 designates the tray #4 when the tray #4 is occupied by the user #2, another selection of the paper-supplying trays is made, and accordingly the tray #5 is selected for the user #2.

The present invention is not limited to the specifically disclosed embodiments, and variations and modification may be made without departing from the scope of the present invention.

What is claimed is:

1. A printing system used by a plurality of users, said printing system comprising a printing apparatus and at least one host apparatus communicating with said printing apparatus by means of bidirectional communication, said printing system comprising;

one or more paper-supplying trays for supplying recording papers to be printed;

tray-designating means for designating one of the paper-supplying trays, said one of the paper-supplying trays being designated by one of the users through said host apparatus, said one of the paper supplying-trays designated by said tray-designating means being exclusively used by said one of the users; and notifying means for notifying another of the users through said host apparatus, when one of the paper-supplying trays currently being exclusively used is designated by said another of the users, the fact that the designated one of the paper-supplying trays is occupied.

2. The printing system as claimed in claim 1, wherein an information table is provided for identifying a status of each of said paper-supplying trays, contents of said information table including user identifications corresponding to respective users who are currently occupying respective ones of the paper-supplying trays.

3. The printing system as claimed in claim 2, wherein the contents of said information table include information on an availability of recording papers and a paper size stored in each of the paper-supplying trays.

4. A printing system used by a plurality of users, said printing system comprising a printing apparatus and at least one host apparatus communicating with said printing apparatus by means of bidirectional communication, said printing system comprising;

one or more paper-supplying trays for supplying recording papers to be printed;

tray-designating means for designating one of the paper-supplying trays, said one of the paper-supplying trays being designated by one of the users through said host apparatus, said one of the paper-supplying trays designated by said tray-designating means being exclusively used by said one of the users; and notifying means for notifying said one of the users through said host apparatus, when said one of the paper-supplying trays currently being exclusively used is designated by another of the users, the fact that said one of the paper-supplying trays exclusively used is designated by said another of the users.

5. The printing system as claimed in claim 4, further comprising canceling means for canceling a designation of said one of the paper-supplying trays made by said one of the users after a notification is given to said one of the users by said notifying means.

6. The printing system as claimed in claim 4, further comprising means for enabling a use of said one of the paper-supplying trays for another of the users by canceling a designation for said one of the paper-supplying trays and effecting a designation made by said another of the users.

7. The printing system as claimed in claim 4, wherein an information table is provided for identifying a status of each of said paper-supplying trays, contents of said information table including user identification corresponding to respective users who are currently occupying respective ones of the paper-supplying trays.

8. The printing system as claimed in claim 7, wherein the contents of said information table include information on an availability of recording papers and a paper size stored in each of the paper-supplying trays.

9. A printing system used by a plurality of users, said printing system comprising a printing apparatus and at least one host apparatus communicating with said printing apparatus by means of bidirectional communication, said printing system comprising;

one or more paper-supplying trays for supplying recording papers to be printed;

tray-designating means for designating one of the paper-supplying trays, said one of the paper-supplying trays being designated by one of the users through said host apparatus, said one of the paper-supplying trays designated by said tray-designating means being exclusively used by said one of the users, the designation of said one of the paper-supplying trays being made by either one of a fixed mode or a non-fixed mode, a single paper-supplying tray being designated by said fixed mode, any one of the paper-supplying trays storing the recording papers of the same size being designated by said non-fixed mode; and means for selecting one of the paper-supplying trays which is not designated by said fixed mode when a designation of the paper-supplying trays is made by said non-fixed mode.

10. The printing system as claimed in claim 9, wherein an information table is provided for identifying a status of each of said paper-supplying trays, contents of said information table including user identifications corresponding to respective users who are currently occupying respective ones of the paper-supplying trays.

11. The printing system as claimed in claim 10, wherein the contents of said information table include information on an availability of recording papers and a paper size stored in each of the paper-supplying trays.

* * * * *